June 14, 1955   G. H. DANIS   2,710,459
PRESSURE-VOLUME DEMONSTRATION DEVICE
Filed Oct. 8, 1952   2 Sheets-Sheet 1

INVENTOR.
GEORGE H. DANIS
BY Herman L. Gordon
ATTORNEY

June 14, 1955  G. H. DANIS  2,710,459
PRESSURE-VOLUME DEMONSTRATION DEVICE
Filed Oct. 8, 1952  2 Sheets-Sheet 2
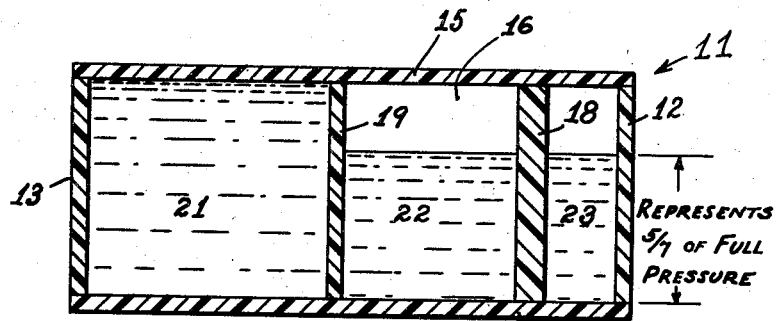
FIG.6  SERVICE BRAKE APPLICATION
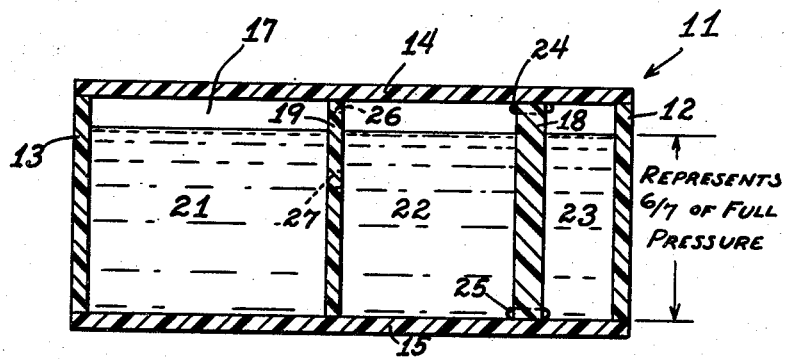
FIG.7  EMERGENCY BRAKE APPLICATION
INVENTOR.
GEORGE H. DANIS
BY Herman L. Gordon
ATTORNEY

United States Patent Office 2,710,459
Patented June 14, 1955

2,710,459

PRESSURE-VOLUME DEMONSTRATION DEVICE

George H. Danis, Indianapolis, Ind.

Application October 8, 1952, Serial No. 313,715

8 Claims. (Cl. 35—13)

This invention relates to a pressure-volume demonstration device, and more particularly to a device for visually demonstrated in Boyle's law.

There is a considerable lack of knowledge of the principles of operation of the railroad air brake system and much misunderstanding thereof among railroad operating personnel. This situation is undesirable and there is a need for some means for visually demonstrating the principles and function of the air brake system if the brake system is to be most effectively used by such personnel.

As heretofore taught, use has been made of diagrams which illustrate the course of the air during the various phases of operation of the air brake system. Though this serves to demonstrate the operation of the brake system, it does not result in understanding of the underlying principles of operation or the pressure-volume relationships that exist in the system.

I have discovered that Boyle's law, as it applies to the pressure-volume relationships in a gas may be related by analogy with the variations in height of a body of liquid of fixed volume when the liquid is permitted to distribute itself among a plurality of containers. My invention may be best understood from the following theoretical considerations:

Boyle's law may be written $$\frac{PV}{T}=\frac{P'V'}{T'}$$

or $$\frac{P'}{P}=\frac{V}{V'}\cdot\frac{T'}{T} \tag{1}$$

where P, V and T are the initial pressure, volume and absolute temperature of a body of gas and P', V' and T' are the final pressure, volume and absolute temperature of the same body of gas. Assuming that the gas is expanded in volume so that the final volume $$V'=V+V_a$$

where $V_a$ is the increase in volume of the gas, Equation 1 may be written in the form $$\frac{P'}{P}=\frac{T'}{T}\cdot\frac{V}{V+V_a} \tag{2}$$

and since a constant temperature may be assumed for the purpose of this demonstration, $$\frac{T'}{T}=1$$

and $$\frac{P'}{P}=\frac{V}{V+V_a} \tag{3}$$

Considering now a volume of liquid in a rectangular container of dimensions A and B, having liquid therein to a height H, the volume $v$ of the liquid will be $$v=ABH$$

If the same volume of liquid is introduced into another container having dimensions A' and B', the liquid will rise to a height H', and since the volume is the same, we may write $$v=A'B'H'$$

or $$ABH=A'B'H'$$

and hence $$\frac{H'}{H}=\frac{AB}{A'B'} \tag{4}$$

If the second container has the dimension A' equal to the dimension A, and the dimension B' is equal to B increased by an amount $B_a$, we may write Equation 4 as $$\frac{H'}{H}=\frac{B}{B+B_a} \tag{5}$$

On comparison of Equation 5 with Equation 3 it will be seen that both equations are of the same form and that if the ratio $$\frac{B}{B+B_a}$$

is made equal to the ratio $$\frac{V}{V+V_a}$$

then $$\frac{P'}{P}=\frac{H'}{H} \tag{6}$$

It is seen from Equation 6 that the ratio of the heights of the liquid in the containers will be equal to the ratio of the final pressure of the gas to the initial pressure of the gas. Furthermore, if the liquid height H is calibrated in terms of the pressure, the final pressure may be directly read from the final height of the liquid, H'.

Having demonstrated that the relation between the pressures of a quantity of gas may be compared, by analogy, to the variations in height of a body of liquid in a container as the dimensions of the container are varied, I have devised a container which embodies the principles of my invention and combines in a single device a plurality of chambers, each having a dimension related as are the operating volumes of an air brake system, which device is admirably suited for visually teaching to railroad operating personnel the principles of Boyle's law as applied to air brakes. It is apparent also that a similar device may be employed to demonstrate the change in pressure with temperature by relating the dimensions inversely to the temperature, or if desired, the change in volume with pressure may be demonstrated.

It is, accordingly, an object of this invention to provide a novel demonstration device capable of visually demonstrating Boyle's law.

It is a further object of this invention to provode a device in which variations in the height of a body of liquid visually exemplify Boyle's law.

It is a still further object of this invention to provide a device in which the dimensions of a container simulate the physical factors in the equation $PVT=K$, where $K$ is a constant.

It is an additional object of this invention to provide a device for demonstrating visually the pressure-volume relations in a railroad air brake system.

It is still another object of the invention to provide a simple device which is easy and inexpensive to manufacture and will visually demonstrate the principles of air brake operation.

It is also an object of this invention to provide a device which is rugged in construction, has no moving parts, and is adapted for demonstrating pressure variations of a gas with change in volume in a manner which may be readily understood by one untrained in physics.

Further objects and advantages of the invention will become apparent from the following description and claims, and from the accompanying drawings, wherein:

Figure 6 is a medial section of the device of Figure 1 taken longitudinally therethrough after rotation thereof in one direction through 90 degrees, said section being taken vertically as in Figure 5.

Figure 7 is a vertical longitudinal cross-sectional view taken through the device of Figure 1 after rotation thereof through 90 degrees in the opposite direction, from the initial position shown in Figure 1.

Figure 1:
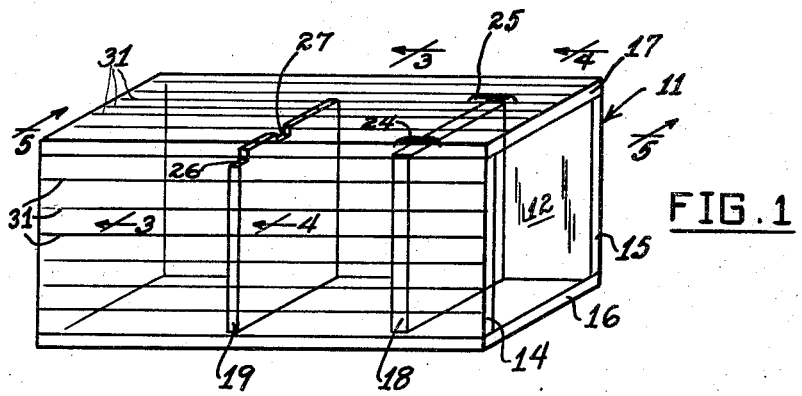
Figure 1 is a perspective view of a device constructed in accordance with the present invention.
Figure 2:
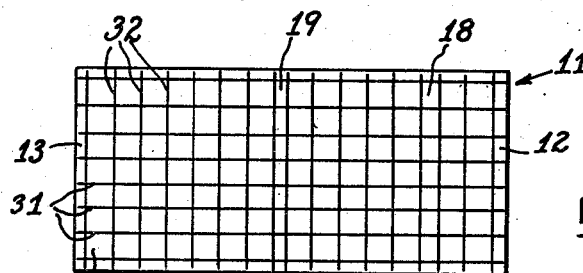
Figure 2 is a plan view showing the bottom of the device illustrated in Figure 1.
Figure 3:
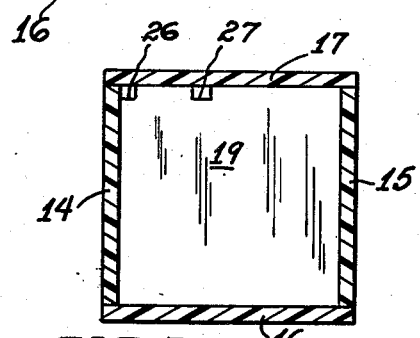
Figure 3 is a section taken on a vertical plane through line 3—3 of Figure 1.
Figure 4:
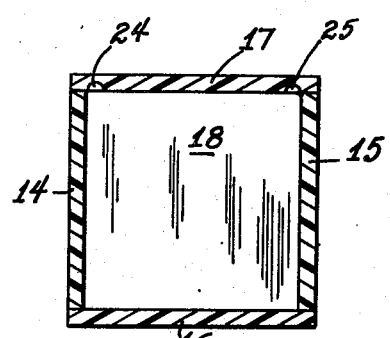
Figure 4 is a section taken on a vertical plane through line 4—4 of Figure 1.

Referring to the drawings, in which like reference numerals designate the same element throughout the several views, there is illustrated one embodiment of the invention in which a hollow rectangular prismatic container is designated generally by the numeral 11. Container 11 comprises the square end walls 12 and 13, rectangular side walls 14 and 15, bottom wall 16 and top wall 17. The walls 12 to 17 of the container may be of any suitably formed transparent material and are preferably formed of transparent plastic sheet material suitably united and sealed at the junctions of the walls thereof.

Disposed within the container are the transverse partitions 18 and 19, spaced from one another and paralleling the end walls 12 and 13 respectively. The partitions 18 and 19 are dimensioned to snugly engage the interior faces of the walls of the container and are sealingly engaged therewith, as by the use of a suitable cement so as to form spaced chambers 21, 22 and 23. The partitions 18 and 19 may be suitably formed of the same transparent plastic as the remainder of the container. The transverse partitions may be of any desired thickness, the partition 19 being illustrated as of the same thickness as the walls of the container while the partition 18 is shown as having a thickness greater than the wall thickness to facilitate flow of the liquid between the chambers 22 and 23, as hereinafter described.

Formed in the interior face of the top wall 17 are the grooves 24 and 25 which may have any desired cross-sectional configuration, here shown as semi-circular. The grooves 24 and 25 have a length greater than the thickness of the partition 18 and communicate at the ends thereof with the chambers 22 and 23. The grooves 24 and 25 are formed in the wall 17 adjacent the interior junctures of the wall 17 with the front and back walls 14 and 15, respectively.

Formed in the partition 19 at the corner thereof adjacent the juncture of the interior faces of the walls 14 and 17, is the transverse notch 26, of any suitable configuration, here shown as square. The opening 26 establishes communication between chambers 21 and 22. An additional notch is formed in the top edge of the partition 19, as shown at 27.

Each of the walls 14 to 17 is provided with a plurality of longitudinal index lines 31 suitably spaced in a manner hereinafter to be described, while the bottom wall 16 is additionally provided with the transverse index lines 32 equidistantly spaced intermediate the transverse walls of the container.

A volume of liquid equal to the combined volumes of the chambers 21 and 22 is introduced into the container in any suitable manner, as, for example, through an opening which is afterwards sealed. Any suitable liquid which will not dissolve the walls of the container may be used, though a liquid having a lower surface tension than water, so as to minimize the height of its meniscus, is to be preferred. I have found a mixture of propylene glycol and water to be suitable, for example.

The method of using my demonstration device hereinbefore described may be best understood when applied to a particular brake system which finds wide application in railroad use. For the purpose of exemplification only, there will be considered an air brake system having an emergency reservoir, an auxiliary reservoir, and a brake cylinder. The air stored in both reservoirs is at the same pressure initially. In "service" operation of the brakes, air stored in the auxiliary tank is admitted therefrom into the brake cylinders. When air is admitted from the auxiliary tank to the brake cylinders, the volume of the body of air from the auxiliary tank will be increased by the volume of the brake cylinders and a drop in pressure of the air will result. This pressure drop may be calculated from Boyle's law as hereinbefore explained. In the event of emergency where an application of the brakes with a greater force is desired, the brake control valve is manipulated to simultaneously connect both reservoirs to the brake cylinders.

For the purpose of illustration, the volumes of the brake cylinders and the reservoirs are assumed to be so proportioned that an initial assumed pressure of 70 pounds per square inch in the reservoirs will result in a pressure of 50 pounds per square inch on the brake pistons on "service" application, and a pressure of 60 pounds per square inch on "emergency" application. From a consideration of Boyle's law, assuming the temperature to be constant, it will be seen that the volumes of the emergency reservoir, the auxiliary reservoir and the cylinders are in the ratio 7:5:2.

Applying this to the demonstration device hereinbefore described, the longitudinally extending lines may divide the walls into 7 equally spaced divisions, each corresponding to a pressure of 10 pounds per square inch. The partitions 19 and 18 are so spaced that the distance between end wall 13 and partition 19, the distance between partitions 19 and 18, and the distance between partition 18 and end wall 12 are in the ratio of 7:5:2. The unit of distance may conveniently be taken as the distance between the lines 31, whereby lines 31 and 32 together form squares on the base 16, the overall length of the container conforming to the units chosen.

Figure 5:
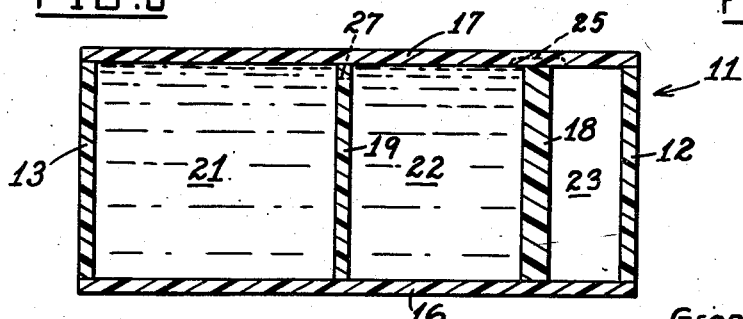
Figure 5 is a section taken on a vertical plane through line 5—5 of Figure 1.

If the container is now placed with the end wall 13 lowermost, all of the liquid will flow through ports 24, 25, 26 and 27 and will fill chambers 21 and 22, leaving chamber 23 empty. The device may then be laid on its bottom 16, as shown in Figure 5, and the liquid will be retained in the chambers 21 and 22, since the passages 24 and 25 are above the level of the liquid. This demonstrates the normal condition of the reservoirs with the brakes released, with the emergency reservoir, exemplified by the chamber 21, and the auxiliary reservoir, exemplified by the chamber 22, under a pressure of 70 pounds per square inch, and the brake cylinders, exemplified by chamber 23, under atmospheric pressure, and hence, zero pounds gage.

If now the container 11 is rotated through 90 degrees so that it rests on wall 14, liquid will flow from chamber 22 into the chamber 23 through passage 24, and the level of the liquid in chambers 22 and 23 will be equalized, as shown in Figure 6, at a height equal to five-sevenths of the initial height of the liquid. Passage 25, now uppermost, will serve to permit the flow of air between the chambers 22 and 23. Since port 27 is so positioned as to be submerged, there will be no transfer of air between chambers 21 and 22, and hence there will be no flow of liquid therebetween. By comparing the height of the liquid with the index lines 31, recalling that the space between index lines was taken to be 10 pounds per square inch, it will be seen that the height of the liquid corresponds to a pressure of 50 pounds per square inch. This position of the demonstration device corresponds to "service" application of the brakes and is exemplified by the interconnection of the chamber 22, corresponding to the auxiliary reservoir, and the chamber 23, corresponding to the brake cylinders. In the described position it will be noted that the chamber 21 will remain full, corresponding to the closed emergency reservoir.

If the container 11 is rotated so that it rests on wall 14 for only a short time (or is tipped for only a short time) and the container 11 is then returned to rest on wall 16 (or 17) before equalization occurs between chambers 22 and 23, this would correspond to the situation where only a partial service application of the train brakes is made.

If the container is rotated so that it rests on the wall 15, as shown in Figure 7, the chambers 21, 22 and 23 will be in intercommunication through the now submerged passages 27 and 25, and liquid from the chamber 21 will flow into chambers 22 and 23, raising the liquid level to a height equal to six-sevenths of the initial height. Passages 26 and 24, now above the level of the liquid, will serve to vent the air between the chambers. It will be seen that this position of the container exemplifies the "emergency" application of the brakes, wherein both reservoirs are connected to the brake cylinders and the pressure on the brake pistons is 60 pounds per square inch.

From the foregoing it will be seen that my invention visually demonstrates the pressure-volume relations of Boyle's law by virtue of the variations in height of a body of liquid. It is apparent that only one wall of the device need be of transparent material, or that, if desired, the level of the liquid may be observed through sight glasses in the wall and the remainder of the wall may be opaque.

Though the device has been described as having the wall 17 uppermost initially, it is apparent that the device will function equally as well if initially positioned with the wall 16 uppermost, since in this position all ports will be submerged and no flow of liquid will take place.

It is apparent that the device described is applied to but one example of the operation of Boyle's law and that other examples will suggest themselves to those skilled in the art. In the device described, the temperature is assumed to be constant. However, from a consideration of the equations earlier presented, it is apparent that the effects of a variable temperature could be demonstrated, if desired.

It is further to be understood that any desired means for establishing communication between the chambers 21, 22 and 23 may be utilized. Thus, ports in the partitions may be selectively closed by valves, or in any other suitable manner.

While a specific embodiment of a pressure-volume demonstration device has been disclosed in the foregoing description, it will be understood that various modifications within the spirit of the invention may occur to those skilled in the art. Therefore it is intended that no limitations be placed on the invention except as defined by the scope of the appended claims.

What is claimed is:

1. A device for demonstrating Boyle's law comprising an enclosed prismatic container, a first partition in said container spaced from one end thereof, a second partition in said container spaced from the other end thereof and from said first partition, said partitions being spaced to form a first, second and third chamber of different volumes in said container, respective passages in the container located adjacent the top corners of said first partition and establishing communication between said first and second chambers, and a pair of additional passages in the container, one of said additional passages being located adjacent a top corner of said second partition and the other of said additional passages being located adjacent an intermediate portion of margin of said second partition and being spaced from the first-named additional passage, said additional passages both establishing communication between said second and third chambers, and a body of liquid in said chambers, the volume of said body of liquid being equal to the total volume of the larger two of said chambers.

2. A device for demonstrating Boyle's law comprising an enclosed rectangular prismatic container, a first partition in said container spaced from one end thereof, a second partition in said container spaced from the other end thereof and from said first partition, whereby to form a first, second and third chamber in said container, the total volume of the first and second chambers being equal to the volume of the third chamber, respective passages in the container located adjacent the top corners of said first partition and establishing communication between said first and second chambers, and a pair of additional passages in the container, one of said additional passages being located adjacent a top corner of said second partition and the other of said additional passages being located adjacent an intermediate portion of the top margin of said second partition, said additional passages both establishing communication between said second and third chambers, and a body of liquid in said chambers, the volume of said body of liquid being equal to the total volume of the second and third chambers.

3. In a device for demonstrating Boyle's law, a container of prismatic configuration which may be supported on its sides to provide at least three different positions of the container, means forming a plurality of side-by-side chambers within said container, a body of liquid in said container having a volume equal to the total volume of a plurality of said chambers but less than the volume of all of said chambers, passage means in the container formed and arranged to establish hydraulic communication between a pair of said chambers when the container is in one of said positions, and passage means in the container formed and arranged to establish hydraulic communication between all of said chambers when the container is in another of said positions.

4. In a device for demonstrating Boyle's law, a container of prismatic configuration which may be supported on its sides to provide at least three different positions of the container, means forming a plurality of side-by-side chambers in said container, a body of liquid in said container having a volume equal to the total volume of a plurality of said chambers but less than the volume of all of said chambers, means forming a pair of passages arranged to establish hydraulic communication between two of said chambers when the container is in one of said positions, said last-named means being located adjacent respective coplanar corners of said two chambers, and means forming at least one other passage and arranged to establish hydraulic communication between one of said last-named chambers and another of the chambers when the container is in another of said three positions.

5. In a device for demonstrating Boyle's law, a container formed with a series of chambers in side-by-side relation, the transverse cross-sections of said chambers being alike, said container being prismatic in shape and being arranged so that it may be supported on its sides in at least three different positions, passage means formed and arranged to establish hydraulic communication between a pair of said chambers in one of said three positions of the container, passage means formed and arranged to establish hydraulic communication between all of the chambers in another of said three positions of the container, and a body of liquid in said chambers, the volume of said body of liquid being equal to the total volume of a plurality of said chambers but less than the volume of all of said chambers.

6. In a device for demonstrating Boyle's law, a container formed with three chambers in side-by-side relation, the transverse cross-sections of said chambers being alike, said container being prismatic in shape and being arranged so that it may be supported on its sides in at least three different positions, passage means formed and arranged to establish hydraulic communication between a pair of said chambers in one of said three positions of the container, passage means formed and arranged to establish hydraulic communication between all of the chambers in another of said three positions of the container, and a body of liquid in said chambers, the volume of said body of liquid being equal to the total volume of two of said chambers but less than the volume of all of said chambers.

7. A device for demonstrating the pressure-volume relationship in a railroad air brake system having a brake cylinder, an auxiliary air reservoir and an emergency air reservoir, comprising a container having a first chamber, a second chamber and a third chamber, the volumes of said chambers being related as the volumes of said brake cylinder and reservoirs, a body of liquid in said container having a volume equal to the total of the larger two of said chambers, means whereby said container may be supported in at least three different positions, passage means in the container formed and arranged to establish hydraulic communication between said second chamber and said first chamber in one of said three positions, and passage means formed and arranged to establish hydraulic communication between the second and third chambers in another of said three positions.

8. A device for demonstrating visually the pressure-volume relationships in an air brake system having a brake cylinder, an auxiliary reservoir and an emergency reservoir, comprising an enclosed prismatic container which may be supported on its sides in at least three different positions, a partition in the container spaced from one end thereof, a second partition in the container spaced from the other end thereof and spaced from the first partition, whereby to form a first, second and third chamber in said container, a body of liquid in said container having a volume equal to the total volume of the larger two of said chambers, the longitudinal dimensions of said chambers being in the same proportion as the volumes of the brake cylinder and the reservoirs, first passage means formed and arranged to establish hydraulic communication between the first and second chambers in one of said three positions, and additional passage means formed and arranged to establish hydraulic communication between said first and second and said second and third chambers in another of said three positions.

References Cited in the file of this patent

UNITED STATES PATENTS

| | | |
|---|---|---|
| 663,236 | Lofy et al. | Dec. 4, 1900 |
| 1,917,846 | Klopsteg | July 11, 1933 |
| 2,419,658 | Rogers | Apr. 29, 1947 |
| 2,526,260 | Mooney | Oct. 17, 1950 |